United States Patent [19]
Springer

[11] 3,815,419
[45] June 11, 1974

[54] AUTOMATIC RESET SYSTEM FOR ALTITUDE ENCODING

[76] Inventor: Earl W. Springer, Box 220, Fairland, Ind. 46126

[22] Filed: Apr. 18, 1973

[21] Appl. No.: 352,319

[52] U.S. Cl. ............................................... 73/384
[51] Int. Cl. ........................................... G01c 21/00
[58] Field of Search ............... 73/384, 386, 387, 4 R, 73/178 R; 340/27 NA, 266, 190; 244/77 D

[56] References Cited
UNITED STATES PATENTS
3,513,708  5/1970  Springer ............................... 73/384
3,626,748  12/1971  Springer ............................... 73/384

*Primary Examiner*—Donald O. Woodiel
*Attorney, Agent, or Firm*—Hood & Coffey

[57] ABSTRACT

In an encoding altimeter of the type including an encoder and one or more motors for driving the encoder in response to the output of a barometric element, a setting and resetting system including, in addition to the basic and primary barometric element, an altitude sensor for providing a first electrical output corresponding approximately to the altitude being sensed, a feedback device for providing a second electrical output corresponding to the altitude position of the encoder, the feedback device being drivingly connected to the motor or motors for movement with the encoder, and a control circuit arrangement including a switch system for transferring the controls of the motor or motors to the said barometric element when the said first and second electrical outputs are balanced.

27 Claims, 7 Drawing Figures

AUTOMATIC RESET SYSTEM FOR ALTITUDE ENCODING

It is a primary object of my present invention to provide an automatic testing, setting and resetting system for an encoding altimeter of the type including an encoder and motor means for driving the encoder in response to the output of a barometric element. Particularly, it is an object of my invention to provide such an automatic testing, setting and resetting system for an encoding altimeter system of the type disclosed in my prior U.S. Pat. Nos. 3,513,708; 3,553,546; 3,559,010; 3,618,058; 3,618,076; 3,626,748; and 3,713,340. I refer to such prior art patents and the prior art references cited therein as constituting prior art pertinent to this present application.

As shown in my prior U.S. patents, my basic encoding altimeter system comprises a first barometric sensing element which preferably is a standard altimeter, an encoder, motor means for driving the encoder and control means for the motor means. The control means includes means for operatively connecting the motor means to the sensing element to drive the encoder in response to the sensing element. In this present application, I refer to the standard or basic altitude sensing device as the first barometric sensing element because I now use a second barometric sensing element for setting and resetting and testing purposes only. This second barometric sensing element provides a first electrical output corresponding approximately to the altitude being sensed. My control means, therefore, includes second means for operatively connecting the motor means to the second sensing element to drive the encoder in response to the second sensing element, this second means including feedback means for providing a second electrical output effective to balance the said first electrical output when the encoder is at an altitude position corresponding to the altitude being sensed. Since I have two separate altitude sensing systems, the control means includes means for transferring control of the motor means between the first and second barometric sensing elements.

My present invention, therefore, comprises means for setting and resetting and testing an encoding altimeter system of the type including an encoder and motor means for driving the encoder in response to the output of a barometric element. The testing, setting and resetting system, itself, includes an altitude sensor for providing a first electrical output corresponding approximately to the altitude being sensed, feedback means for providing a second electrical output corresponding to the altitude position of the encoder, the feedback means being drivingly connected to the motor means, and control means including means for transferring the control of the motor means to the basic barometric element when the first and second electrical outputs are balanced.

I prefer that the second sensing element be a transducer electrically connected to a voltage source such that the said first electrical signal is a voltage output corresponding to the altitude being sensed. Then, I prefer that the feedback means include potentiometer means drivingly connected to the encoder or to the motor means and electrically connected to a voltage source such that the said second electrical signal is a voltage output corresponding to the altitude position of the encoder. I further prefer that the potentiometer means include a pair of potentiometers cross connected to provide a bridge circuit having its input connected across the voltage source, the potentiometers having wipers drivingly connected to the motor means and providing outputs for the bridge circuit. Each of these bridge circuit outputs is connected to an input terminal of one of the pair of operational amplifiers. The output of the altitude sensor is connected to another input of each operational amplifier. I then prefer that the motor means includes first and second stepping motors with, respectively, first and second energizing circuits. One motor drives the system upwardly and the other drives it downwardly. Each motor energizing circuit is connected to one of the said operational amplifiers. Thus, when the electrical output of the feedback means is not in balance with the output of the altitude sensor, one of the two operational amplifiers will provide an output to drive its associated motor until there is a balance. When this balance is achieved, the control of the motor means is turned over to the first barometric sensing element which, in my preferred system, is the standard aircraft altimeter, the pointer of which I track electro-optically.

Now, the potentiometer bridge system just described gives me an important advantage. Particularly, as will be more fully appreciated as this description progresses, the two potentiometers can be adjusted relative to each other to provide a dead zone bracketing the altitude being sensed by the system and throughout which the bridge circuit will not put out an output effective to energize either motor energizing circuit. I carefully establish this dead zone such that, once the feedback means is balanced out with the altitude sensor, the setting and resetting system will not again drive the motor means until the limits of the dead zone are exceeded. I prefer to set the dead zone such that an altitude pressure change of 100 plus or minus feet is possible before an UP or DOWN signal is given to the stepping motor SCR.

Since the motor means can be controlled by either of two altitude sensing systems, I provide means for automatically transferring the control between the two systems. In my preferred embodiment, this said transfer means includes zero tab means on the encoder for providing an electrical signal establishing when the encoder is driven downwardly to zero, first switch means for energizing the motor means to drive the encoder downwardly, second switch means for energizing the motor means to drive the encoder upwardly, the second switch means being responsive to the output of the zero tab means to stop the downward driving of the encoder and to start the upward driving of the encoder, third switch means for stopping the upward driving of the encoder when the said first and second electrical outputs are balanced, i.e., when the outputs of the altitude sensor and feedback means are balanced, and fourth switch means for energizing and deenergizing the light source means of the means for tracking the pointer of the aircraft altimeter. The fourth switch means is responsive to the said first and second electrical outputs to permit the tracking means to control the motor means when the first and second electrical outputs are balanced.

In this description, the term "switch means" is intended to apply to a wide variety of electrical devices which are responsive to signal current to permit current flow in another circuit. Thus, the term "switch means"

may apply to such solid state devices as silicon controlled rectifiers, sometimes hereinafter referred to as "SCR's" or simply "rectifiers" or such electromechanical devices as relays or any combination of SCR's and relays.

In other words, the transfer means, in my preferred embodiment, include switch means for activating and deactivating the tracking means, the switch means being responsive to the outputs of the altitude sensor and the feedback means to activate the tracking means when the outputs are balanced and to deactivate the tracking means when the outputs are unbalanced. From the description provided in my said U.S. patents, it will be appreciated that the motor means could not be driven by the altitude sensor without first deactivating the optical system which brackets the pointer of the altimeter.

Further, as will be described hereinafter, the transfer means includes means for automatically connecting the output of the encoder to the transponder so that the altitude at which the plane is flying can be transmitted to ground when the system is "On the Air" with the tracking means following the 100-foot pointer on the altimeter reference.

My preferred encoder includes a 100-foot disc and a 500-foot disc. The 500-foot disc is mounted on a shaft, the rotational positions of which correspond to the ranges of altitude within the total range of the system. I use this very convenient output shaft advantageously to provide linearity compensation means for the output of the altitude sensor and for altitude scale factor calibration means for the potentiometer bridge circuit described above. Particularly, the linearity compensation means and altitude scale factor calibration means comprise rotary means for providing variable resistances, the rotary means being drivingly connected to the shaft for the 500-foot disc of the encoder. It will be seen that in the preferred embodiment, I use rotary switch means drivingly connected to the 500-foot disc to select predetermined calibration and compensation resistances for each range of altitude within the total range of the system.

Other objects and features of my present invention will become apparent as this description progresses.

To the accomplishment of the above and related objects, this invention may be embodied in the forms illustrated in the accompanying drawings, attention being called to the fact, however, that the drawings are illustrative only, and that changes may be made in the specific constructions illustrated and described, so long as the scope of the appended claims is not violated.

In the drawings:

FIG. 1 is a block diagram of my basic encoding altimeter system while

FIG. 2 is a schematic diagram of the system shown in block diagram form in FIGS. 1 and 1a;

Figure 1:
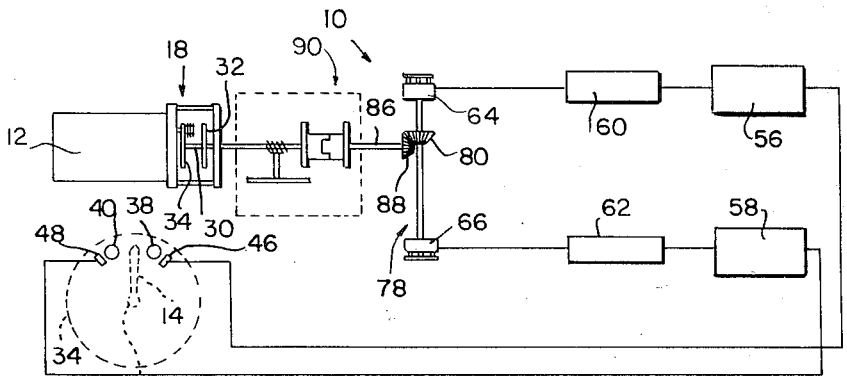

Referring to FIG. 1, it will be seen that I have illustrated a block diagram of my basic encoding altimeter which was disclosed initially in my U.S. Pat. No. 3,513,708. My basic encoding altimeter 10 comprises a standard aircraft altimeter 12 which is equipped with an indicator or pointer 14 arranged for pivotal movement about an axis extending through the point 16 and means, indicated generally by the reference numeral 18, for tracking the movement of the indicator 14. My tracking means 18, which I sometimes refer to as a "reader" because of its function of reading the altimeter 12, is arranged to track the movement of the indicator 14 by projecting and reflecting light through the conventional cover plate of the altimeter 12. The tracking means 18 is mounted in front of the cover plate to be in alignment with the pivot axis of the indicator 14. The tracking means 18 comprises a shaft 30 journalled to be on a coinciding axis with the axis of the altimeter and a support plate 34 mounted on the shaft 30 for rotation therewith. I provide a pair of light sources 38, 40 (exciter lamps 38, 40) mounted on the support plate 34 to direct light through the cover plate of the altimeter toward the path of movement of its indicator 14. A light-responsive device 46, 48 is associated with each light source 38, 40, the light-responsive surface of each device facing the path of movement of the indicator 14. Each device 46, 48 electrically changes state when the amount of light impinging thereon changes to a predetermined degree. Since I project light at the path of movement of the indicator 14, when the indicator moves adjacent to one of the light-responsive devices, the indicator will reflect light back toward the device to cause it to change state. It is necessary, of course, to amplify the outputs of the devices 46, 48 so that these outputs can be used by other electrical equipment. Such amplifiers are indicated by the reference numerals 56, 58. Each amplifier 56, 58 is coupled to the gate electrode of a silicon controlled rectifier 60, 62 which is, in turn, connected to and arranged to energize a rotary stepping motor 64, 66. The rotary stepping motors 64, 66 comprise a drive means for the support plate 34 on which the light sources 38, 40 and devices 46, 48 are mounted.

Figure 6:
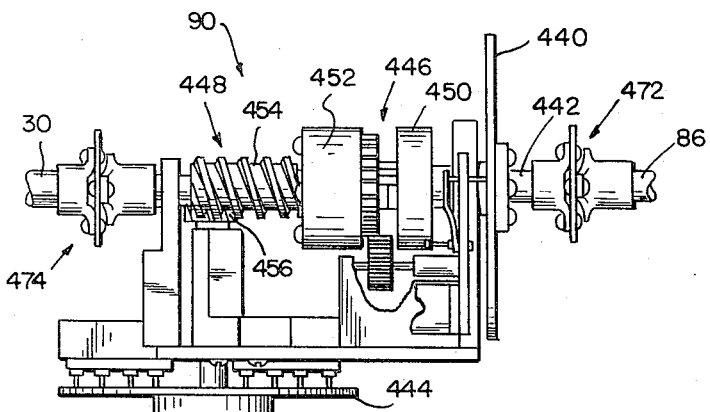
FIG. 6 is an elevational view of my preferred encoder.

It will be appreciated that, when the indicator 14 moves close to the device 46 and reflects light thereupon, the motor 64 will be energized to drive the support plate 34 on which the device 46 is mounted about the axis of the shaft 30. When the indicator 14 moves close to the device 48, the motor 66 will be energized to drive the support plate 34 in the opposite direction. Each motor 64, 66 drives the support plate 34 in a step-by-step manner, motor 64 driving the plate in steps in one direction and motor 66 driving the plate in steps in the opposite direction. As explained in my prior U.S. Pat. No. 3,513,708, the stepping motors 64, 66 are controlled by the outputs of the devices 46, 48 to keep the devices bracketing the indicator 14. Diagrammatically, I show common shaft means 78 between the motors with a bevel gear 80 on the shaft means 78 drivingly connecting a shaft 86 to the motors through another bevel gear 88. The shaft 86 is an input shaft for an encoder 90, the preferred structure of which is disclosed in my U.S. Pat. No. 3,618,058. The shaft 86 is directly coupled through the encoder to the shaft 30 as shown in FIG. 6.

Figure 1A:
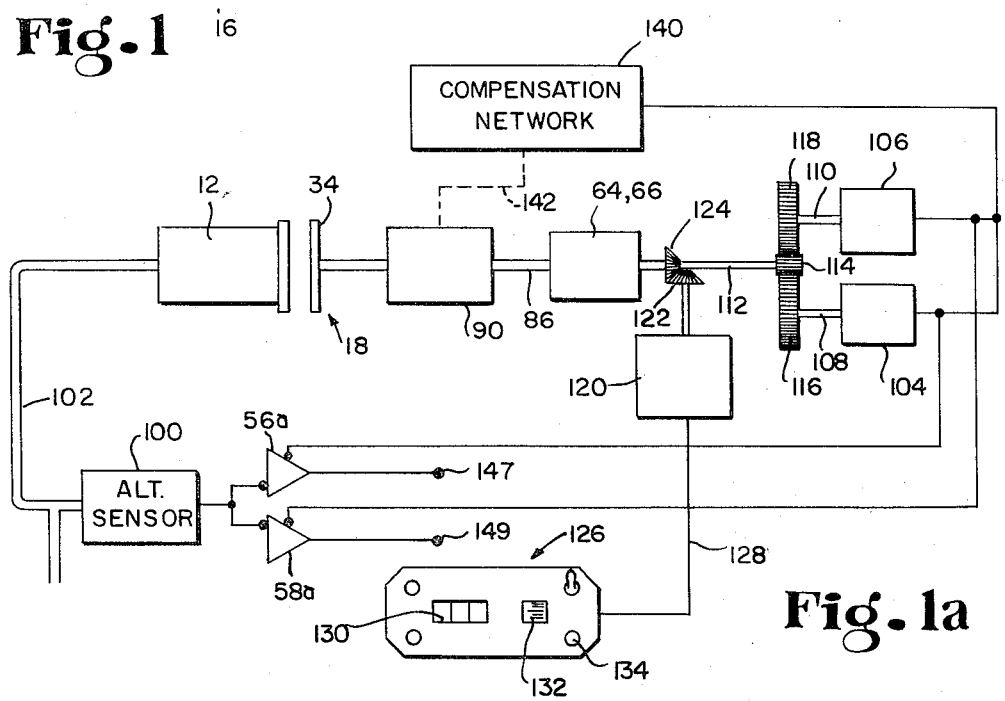
FIG. 1a is a block diagram of my basic system incorporating the testing, setting and resetting feature of the present invention.

Referring now to FIG. 1a, it will be seen that I have shown a block diagram of my basic system with my additional automatic setting and resetting features incorporated therein. Like reference numerals, of course, represent like parts.

In FIG. 1a, I show, in addition to the altimeter 12, an altitude sensor 100 which is connected to the same static line 102 as the altimeter. The output of this sensor 100 is fed to the input terminals of an "up" amplifier 56a and "down" amplifier 58a. A pair of potentiometers 104, 106 in a bridge provide inputs, respectively, to these two amplifiers. Each of the potentiometers 104, 106 has a rotary input shaft 108, 110 which is drivingly connected to a shaft 112 driven by stepping motors 64, 66. This driving connection is ideally obtained, for instance, by means of a gear 114 on the shaft 112 which drives gears 116, 118, respectively, on the input shafts 108, 110. The outputs of the potentiometers 104, 106, therefore, depend upon the position of the shaft 112 which is driven along with the support plate 34 and the input shaft 86 of the encoder 90. The manner in which the potentiometers 104, 106 are driven by the shaft 112 will be better appreciated after the discussion of FIG. 2 which shows the potentiometers crossed into a bridge with their wipers connected as inputs to the amplifiers 56a, 58a.

Also shown in FIG. 1a is a synchro transmitter 120 drivingly connected to the shaft 112 by means of bevel gears 122, 124 and electrically connected as indicated at 128 to a pilot's control 126. The pilot's control 126 includes a numerical indicator 130, barometric scale 132 and knob 134 for adjusting the barometric scale. Particularly, as fully disclosed in my earlier patents 3,513,708 and particularly 3,713,340, the pilot's control includes a synchro receiver which is dominated by the transmitter 120. The stator of the synchro receiver is adjustable about its axis. The knob 134 is drivingly connected to the stator by gear means. By using the knob 134 and the scale 132 which is driven by the knob, a pilot can set in, as a reference, the local barometric pressure.

Also shown in FIG. 1a is a compensation network or calibration network 140 which preferably comprises rotary switch means driven from the encoder 90 as indicated at 142.

Figure 5:
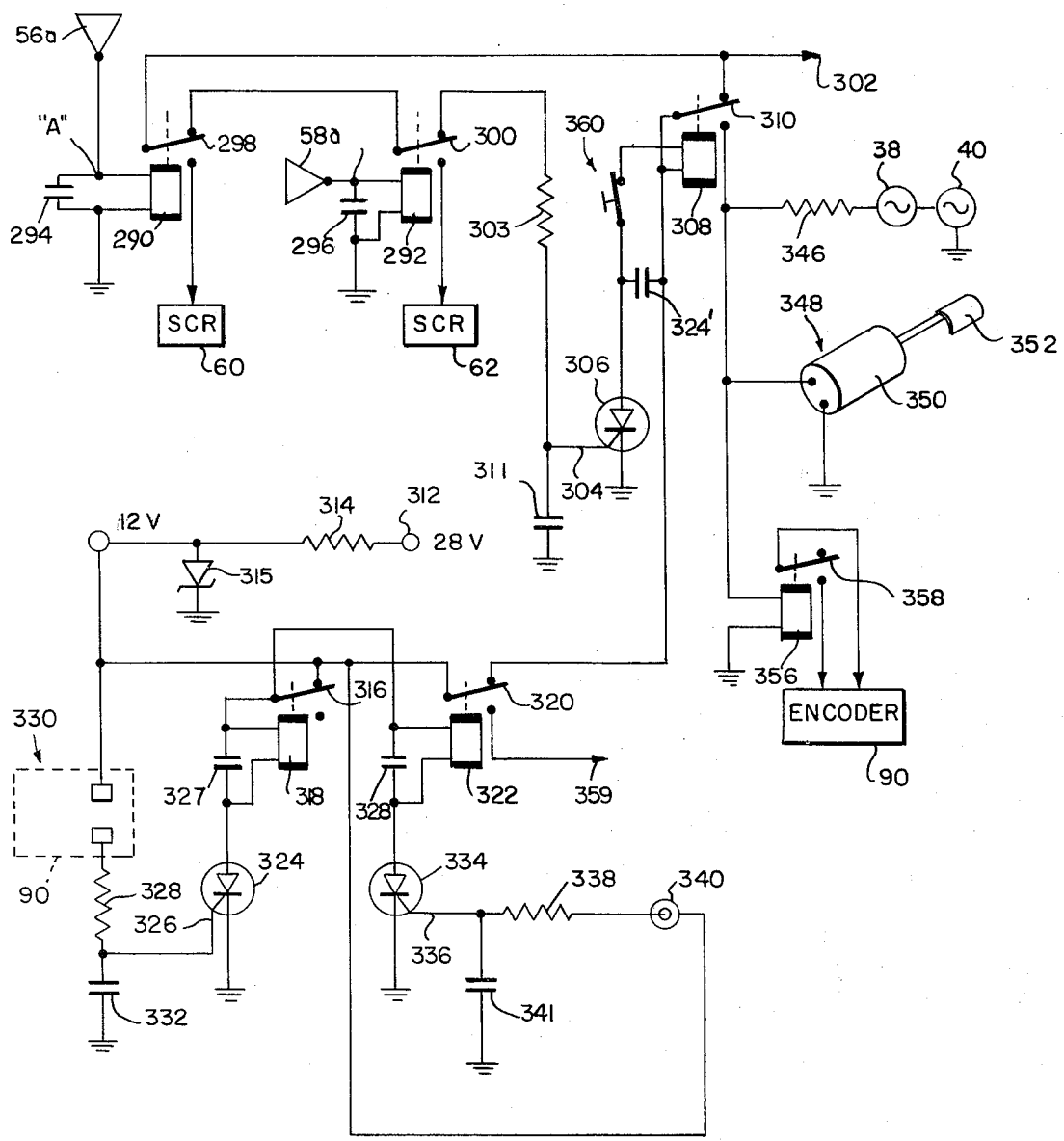
FIG. 5 is a schematic diagram of the control system for transferring the control of the drive motors between the two separate altitude sensing systems.

Not shown in FIG. 1a are the light-responsive devices 46, 48 and their respective amplifiers 56, 58 and silicon controlled rectifiers 60, 62. It will be appreciated that those elements are operatively connected to the stepping motors 64, 66 as illustrated in FIG. 1. Thus, the stepping motors 64, 66 are energized to drive the encoder 90, support plate 34, potentiometers 104, 106, and synchro transmitter 120 by outputs from the devices 46, 48 in the normal operating mode and by the output of the altitude sensor 100 during the setting and resetting mode. Particularly, the outputs 147, 149 of the amplifiers 56a, 58a are operatively connected to the gate electrodes of the silicon controlled rectifiers 60, 62, respectively. When the altitude sensor 100 is controlling the motors 64, 66, control circuit means such as shown in FIG. 5 is provided for turning off the exciter lamps 38, 40.

Figure 2:
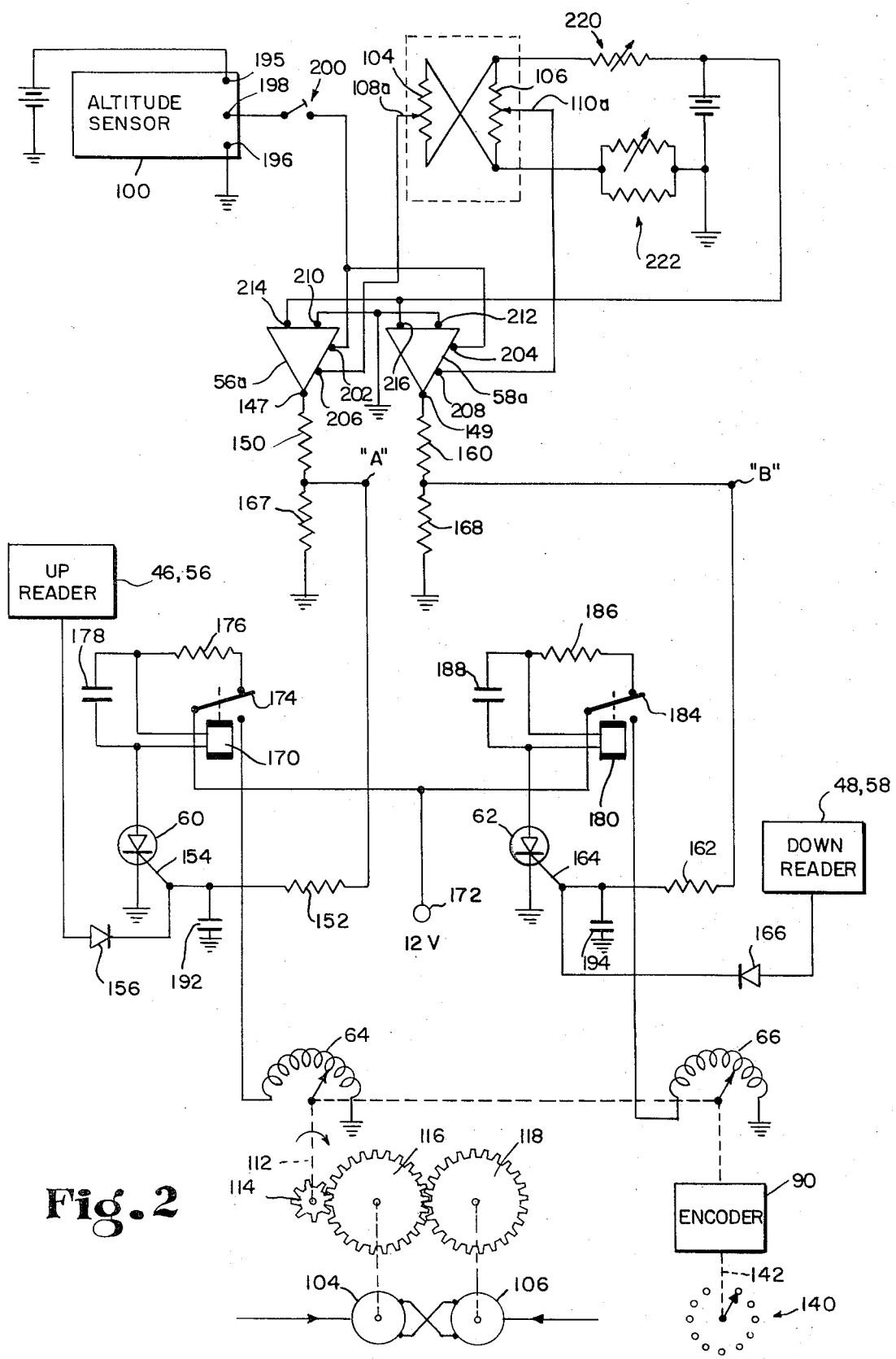

Turning to FIG. 2, it will be seen that the output 147 of the amplifier 56a is connected through resistors 150, 152 to the gate control electrode 154 of the SCR 60. A diode 156 is connected between that electrode and the device 46 and amplifier 56 of what I refer to as the "up reader." Similarly, the output 149 of the amplifier 58a is connected through resistors 160, 162 to the control electrode 164 of the SCR 62. Another diode 166 is connected between that control electrode 164 and what I refer to as the "down reader" consisting of the device 48 and amplifier 58. I show points "A" and "B" in the outputs of the amplifiers 56a and 58a which are connected to ground by resistors 167, 168, respectively.

In the illustrative embodiment, the rectifier 60 controls a relay 170 which serves to connect the stepping motor 64 to the power terminal 172. Particularly, when the rectifier 60 is turned on by a pulse to its gate electrode 154, the rectifier becomes conductive so that current can flow from the power terminal 172 through the switch 174 of the relay 170 and a resistor 176 to ground. This causes the relay 170 to pull in its switch contact 174 to connect the stepping motor 64 directly to the power terminal 172. The resistor 176 and the capacitor 178 connected across the relay 170 provide a time constant effective to keep the relay pulled in for a time sufficient to energize the stepping motor 64 for one step. The rectifier 62 similarly controls a relay 180 such that, when the rectifier is conductive, current flows from the power terminal 172 through the relay switch contacts 184, resistor 186 and the relay itself to ground. A capacitor 188 is connected across the relay 180 to cooperate with the resistor 186 in keeping the relay energized for a period of time sufficient to move the motor 66 one step. Capacitors 192, 194 are conventionally connected between the gate electrodes 154, 164, respectively, and ground.

The altitude sensor 100 includes a power input terminal 195 and ground terminal 196. The output terminal 198 of the sensor 100 is connected through a switch 200 to the control input terminals 202, 204 of the amplifiers 56a, 58a. Each amplifier has two control input terminals. The other control input terminal 206 of the amplifier 56a is connected to the wiper 108a of the potentiometer 104 while the other control input terminal 208 of the amplifier 58a is connected to the wiper 110a of the potentiometer 106. The amplifiers have ground terminals 210, 212 and power input terminals 214, 216.

Each of the amplifiers 56a and 58a may preferably be commercially available, high-performance operational amplifiers provided in integrated circuit form. Such amplifiers are available from Texas Instruments, Incorporated, Post Office Box 5012, Dallas, Tex. and carry the Texas Instruments designation Ser. No. 52,741 and Ser. No. 72,741. The amplifiers have high-mode input voltage range and the absence of latch-up make the amplifiers ideal for voltage-follower applications. Further, the altitude sensor 100 may preferably be an absolute pressure transducer of the type sold by National Semiconductor Corp., and identified by the model number LX 1600A. The sensor contains a pressure diaphragm and reference which produces strain, a piezo resistive strain sensor providing a voltage output, a signal discriminator and conditioner providing a signal output and an amplifier and signal processor providing a voltage output at the terminal 198.

The potentiometers 104, 106 are preferably connected as a bridge to the voltage source to provide an output voltage to the terminals 206, 208 proportional to the position of the shaft 112 to which they are drivingly connected. The potentiometers 104, 106, therefore, constitute feedback means for providing an output establishing the position of the support plate 34 and shaft 112. When the support plate 34 is driven to an altitude corresponding to the altitude output of the sensor 100, the potentiometers 104, 106 will provide, respectively, voltage outputs to the amplifiers 56a, 58a to balance the amplifiers so that they will not trigger on the rectifiers 60, 62. In other words, if the system is not balanced, the sensor 100 and the potentiometers 104, 106 will provide an output which will cause one of the two amplifiers 56a or 58a to trigger on its associated rectifier 60, 62 to drive the support plate 34, potentiometers 104, 106 and the encoder 90 to an altitude position corresponding to the output of the sensor, i.e., a balancing position.

In FIG. 2, I show resistor means 220, which may be adjustable, between the voltage source and one side of the potentiometer 104, 106 bridge and another resistor means 222, which may also be adjustable, between the other side of the bridge and ground. In some cases, the resistance means 220 may be a fixed resistor of a value such as 40 kilohm. The compensating resistance means for my preferred embodiment will be discussed hereinafter in conjunction with FIGS. 3 and 4.

Figure 3:
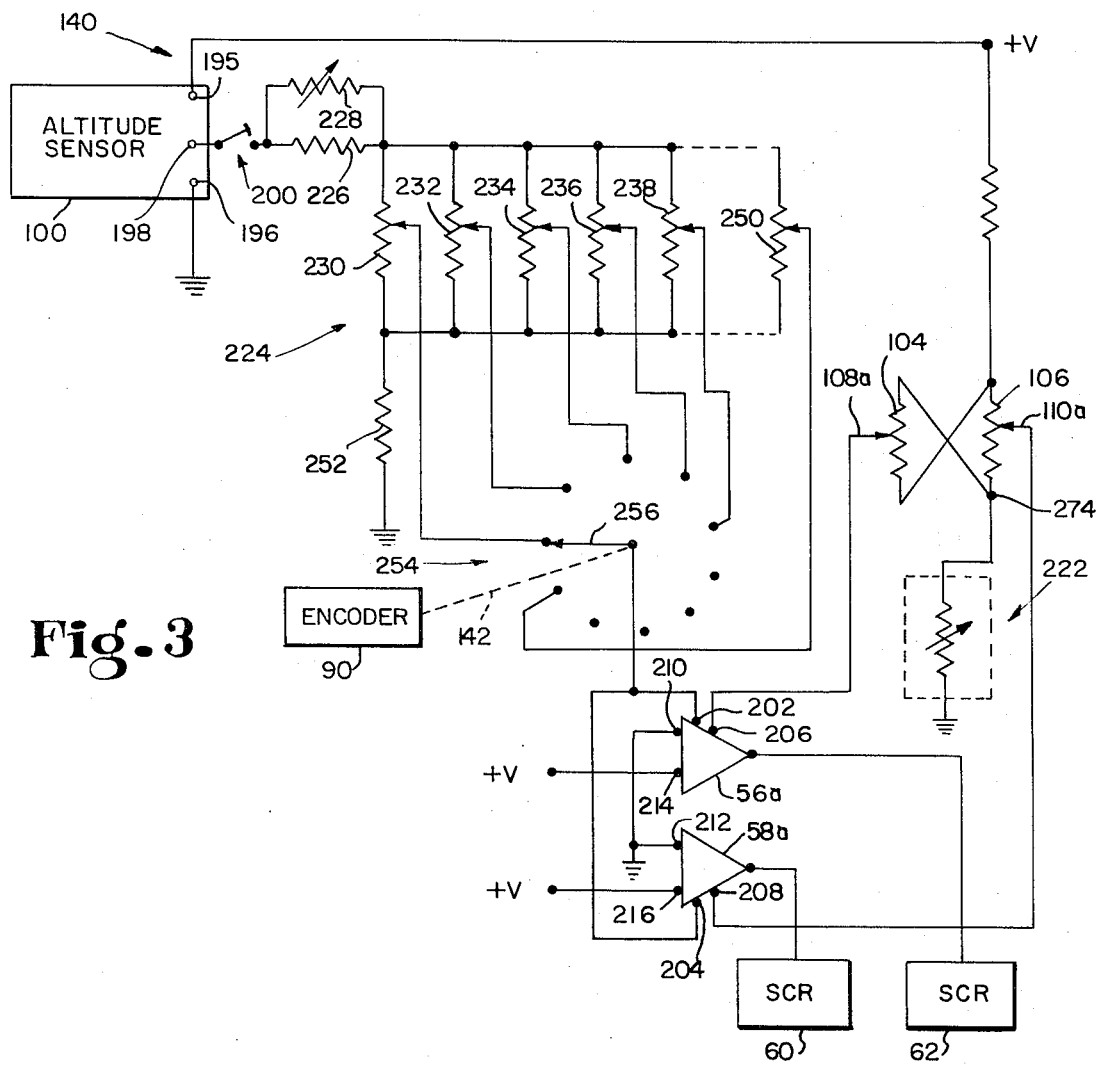
FIG. 3 is a schematic diagram of the linearity compensation means for the altitude sensor.
Figure 4:
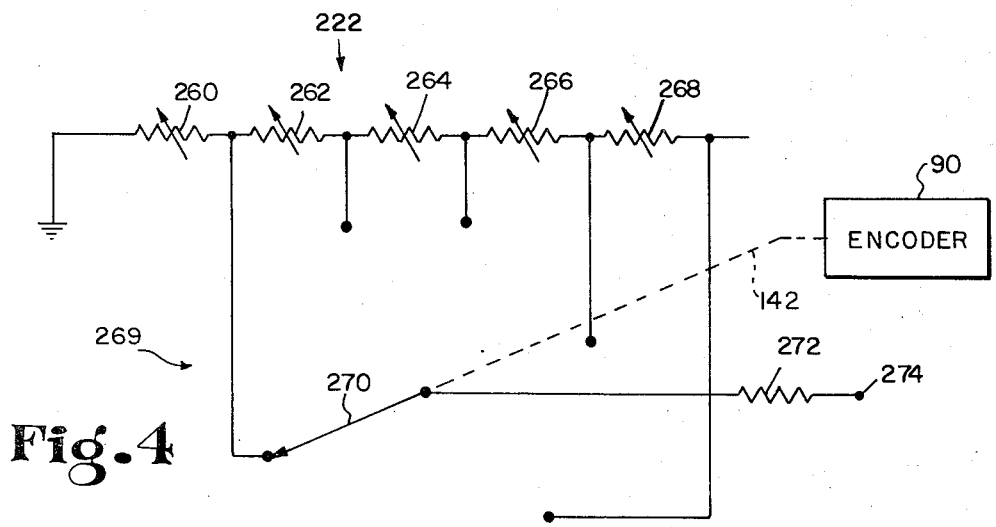
FIG. 4 is a schematic diagram of the altitude scale factor calibration means for the feedback system.

Referring now to FIGS. 3 and 4, I will describe my preferred compensation network or calibration network 140. I presently believe that it is advisable to provide a resistor network 224 between the output 198 of the sensor 100 and the inputs 202, 204 of the amplifiers 56a, 58a. In FIG. 3, I show a series resistor 226 with a variable resistor 228 connected in parallel therewith. The resistor 226 may be, for instance, a three kilohm resistor while the resistor 228 may be a 3 kilohm temperature compensating resistor at 26° C. Such variable resistors 228 are known as thermistors. I obtain a first level adjustment by adjusting the resistor 228 for temperature compensation. In addition, I prefer to use a bank of ten 50 kilohm adjustable resistors 230 – 250 connected in parallel between the resistor 226 and a resistor 252 which leads to ground. The wipers of the adjustable resistors 230 – 250 are connected as illustrated to the stationary contacts of a rotary selector switch 254, the rotor-contact 256 of which is connected to the input terminals 202, 204. I then drivingly connect the rotary switch 254 to the encoder 90 as indicated at 142, and particularly to the 500-foot disc of the encoder. I can, of course, adjust selectively each of the resistors 230 – 250 to provide ten different resistor values between the output 198 and the inputs 202, 204. By drivingly connecting the rotary switch 254 to the 500-foot disc such that the rotor-contact 256 will move one step per each one-tenth revolution of the disc, I can keep the voltage output of the sensor 100 per 5,000-foot change in altitude generally constant throughout the total range of the system. The movement of the 500-foot disc will be discussed in conjunction with FIG. 6. It will be appreciated that the driving connection between the 500-foot disc of the encoder and the rotary switch 254 may be made in conventional fashion to provide the desired operation of the rotary switch.

The network 224 and the rotary switch 254, therefore, comprises means for correcting the known and easily determined nonlinear conditions of the altitude sensor 100. I propose that the ten resistors 230 - 250 be adjusted in the factory or in the flight line maintenance shops.

While the nonlinearity of the sensor 100 is compensated by the network 224 and rotary switch 254, the resistance means 222 provides an altitude scale factor compensation. In other words, any altitude scale is nonlinear. By observing an altitude mercury manometer, one can see that the scale of the manometer is contracted at the higher altitudes. This is because there is simply less air (atmospheric density) to push the mercury down at the higher altitudes. At zero feet, for instance, there is a factor of one while at 15,000 feet there is a factor of one-half, at 31,000 feet there is a factor of one-fourth and at 52,000 feet there is a factor of one-eighth. These are factors of the amount of scale change with reference to linearity.

While various forms of compensation devices might be used, I prefer to use a series of variable resistors 260 – 268 connected to a rotary selector switch 269, the rotor-contact 270 of which is connected through a resistor 272 to the terminal 274 at one side of the potentiometer 104, 106 bridge. The rotor-contact 270 is again drivingly connected to the 500 foot disc of the encoder 90 as indicated at 142. I propose that the resistors 260 – 268 be adjusted in the factory or in the airport maintenance shops before installation of my system.

Turning now to FIG. 5, it will be seen that I have illustrated a setting and resetting system which may preferably be incorporated into the overall system illustrated in FIG. 2. In FIG. 2, I show the points "A" and "B" at which I can insert my test set and reset circuitry shown in FIG. 5. Particularly, at the points "A" and "B" in the outputs of the amplifiers 56a, 58a, I place relays 290, 292. These relays have capacitors 294, 296 conventionally in parallel therewith and switch contacts 298, 300 as illustrated. Each relay 290, 292 feeds the gate control electrode 154, 164 of its respective SCR 60, 62. I show a terminal 302 which may preferably connect the power input terminals 214, 216 of the amplifiers 56a, 58a to the power source.

When the two switch contacts 298, 300 of the relays 290, 292 are in their illustrated position, current can flow from the terminal 302 through the contacts 298, 300 and a resistor 303 to the gate control electrode 304 of a silicon controlled rectifier 306. This rectifier 306 dominates a relay 308 having a switch contact 310. A capacitor 311 is connected between the gate electrode 304 and ground. The rectifier 306, when rendered conductive by a signal on its gate electrode 304, causes current to flow from an input terminal 312 through a resistor 314 and switch contacts 316 of a relay 318 and 320 of a relay 322 through the coil of the relay 308. The voltage source on the terminal 312 is regulated to 12 volts by a Zener diode indicated at 315.

The relay 318 is dominated by a rectifier 324, the gate electrode 326 of which is connected through a resistor 328 and what I refer to as zero tab contacts 330 on the encoder 90 to the Zener regulated source. A capacitor 327 is in parallel with the coil of the relay 318 and another capacitor 332 is connected between the gate electrode 326 and ground. I now refer to my U.S. Pat. No. 3,626,748, and particularly to FIG. 6 of that patent and the discussion associated therewith concerning the provision on the encoder of means for providing an electrical signal output when the encoder is driven to a position representing zero altitude. My preferred encoder, illustrated in FIG. 6, includes a 100 foot disc and a 500 foot disc as will be described hereinafter. I provide a contact strip on the 100 foot disc and a contact strip on the 500 foot disc. I then provide contact members which engage, respectively, the strips and which are electrically connected such that, when the two discs are simultaneously in a position corresponding to zero altitude, current can flow through the contact members and contact strips. It is this current that I feed to the gate control electrode 326 of the rectifier 324.

The relay 322 is dominated by an SCR 334, the gate control electrode 336 of which is connected through a resistor 338 and a push-to-test switch 340 to the Zener regulated power source. A capacitor 341 is conventionally connected between the gate 336 and ground.

When the relay 308 is pulled in to move its switch contact 310 downwardly as illustrated in FIG. 5, it connects the Zener regulated source (terminal 312) to exciter lamps 38, 40 through a resistor 346; a solenoid operated flag 348 including a coil 350 and flag 352; and another relay 356 including a switch contact 358 for disabling the encoder 90.

With the above circuit arrangement in mind, I will now describe its operation. The SCR 324 and relay 318 are effective to recognize when the system has been driven back to zero, i.e., when the encoder itself has been driven back (downwardly) to zero to provide current flow through the zero tabs 330 on the encoder. When this happens, the relay 18 pulls in momentarily and then returns to its illustrated neutral position. This serves to stop the downward slue. The objective, when the system gets to zero, is to start driving the system upwardly. That is, the objective is to pull in the relay 290 to start the drive upwardly. In order to keep the relay 308 from being pulled in at this point, I place a 47 microfarad capacitor 311 between the gate of the SCR 306 and ground. The time constant of the resistor 303, which may be a 33 kilohm resistor, and the capacitor 311 is such that it will block the firing of the rectifier 306 for a time period sufficient to permit the relay 290 to pull in to start the upward drive. A capacitor 324' is connected across relay 308.

The test which includes the down slue is started by pushing on the test switch 340 to connect the gate electrode 336 of the rectifier 334 to the voltage source to pull in the relay 322 to provide a starting signal to the control circuitry for the motor 66 which drives the system downwardly. The output terminal 359 of the relay 322, for instance, may be connected as an input to the amplifier 58a or the gate electrode of the rectifier 62.

In the testing operation, i.e., the driving of the system downwardly to zero and upwardly again to the prescribed altitude, the relays 308, 356 are decommissioned because the switch contact 320 of the relay 322 is pulled in to keep current from flowing through the relay 308. This means that the exciter lamps 38, 40 of the optical tracking means or reader 18 will not be illuminated, that the flag 352 will be over the numerical indicator 130 on the pilot's control 126, and that the encoder 90 will be disconnected from the transponder. The relay 308 is energized to turn on the lamps 38, 40 of the tracking means 18 when and only when both of the relays 290, 292 are not energized such that their switches 298, 300 are in their illustrated positions to permit current flow to the gate 304 of the rectifier 306. This is how I effect a transfer of control from the altitude sensor 100 to the tracking means 18.

I prefer to provide an on-off toggle switch 360 for the pilot's use in decommissioning relay 308 if the pilot desires. This switch may be used, for instance, to turn the encoder off if it disagrees with the pilot's own backup altimeter on which he is relying for flying.

In summary, therefore, the 28 volts placed upon the terminal 312 and reduced to 12 volts by the Zener diode 315 is fed to and through the switch contacts 310 of the relay 308 when the relay is deenergized (illustrated condition) to provide a voltage source through the terminal 302 to the amplifiers 56a, 58a. When the relay 308 is pulled in, this voltage source is removed from the amplifiers 56a, 58a to decommission them so that the system can and will be controlled by the tracking means 18 in the manner discussed in conjunction with FIG. 1.

After the system has been slued to zero, and starts driving upwardly again, it will drive upwardly until there is a balance between the outputs of the potentiometer 104, 106 bridge and the output of the altitude sensor 100, at which point the system will quit driving. It will quit driving, that is, when the two switch contacts 298, 300 are in their illustrated positions to provide current to the gate of the rectifier 306.

Turning finally to FIG. 6, it will be seen that I have illustrated my preferred encoder 90, the structure of which is completely described in my U.S. Pat. No. 3,618,058. The encoder comprises a 100 foot disc 440 mounted on a shaft 442 for rotation therewith. This disc 440 is driven directly with the support plate 34 on which the light-responsive devices 46, 48 are mounted with one complete revolution of the plate representing an altitude change of 1,000 feet. My encoder comprises a 500 foot disc 444 which is drivingly connected to the disc 440 by means of an intermittent motion transfer mechanism 446, and a worm and worm gear means 448. The input 450 of the mechanism 446 is connected to the shaft 442 for rotation with the disc 440. The output 452 of the mechanism 446 is mounted for rotation relative to the shaft 442 and the mechanism preferably includes means for providing a 5:1 step reduction between the input 450 and the output 452. The worm 454 of the gear means 448 is connected to the output 452 for rotation relative to the shaft 442. The worm gear 456 is mounted on the shaft 458 on which the disc 444 is mounted. The worm and worm gear means 448 provides a 10:1 reduction. Since the disc 440 is driven in steps, the output 452 will be driven one step each time the disc 440 is driven through five steps in one direction. Since there is a 10:1 reduction provided by the worm and worm gear means 448, one step of the disc 444 will be 3.6° which equals an increment of altitude of 500 feet. Thus, a full revolution of the disc 444 represents 50,000 feet.

The rotary switch 254, therefore, provides a new calibration resistance between the output of the sensor 100 and the inputs of the amplifiers 56a 58a for each 5,000 foot increment of altitude. The rotary selector switch 369 is similarly connected to the 500 foot disc 444 or, more particularly, to the shaft 458 on which that disc is mounted for rotation therewith. Misalignment couplings 472, 474 are provided for connecting the encoder between the shafts 86 and 30.

Referring to FIGS. 1a, 2, 3 and 5, I will discuss my ability to adjust the dead zone, step-wise, of the relays 290, 292 (FIG. 5) by adjusting the relative positions of the potentiometer wipers (sliders) 108a, 110a. In practice, I set the spacing of the wipers 108a, 110a such that an altitude pressure change of 100 feet is possible before an UP or DOWN signal is given to the stepping motor SCR 60, 62. Without such a dead zone, the system would always be "hunting" a null which is a common characteristic of servo systems. With my stepping system and the dead zone, I can and do establish a "nonhunting" operation of the total system.

While the dead zone adjustment may be made in a number of different ways, I can easily accomplish the relative spacing of the wipers 108a, 110a by adjustably rotating the barrels of the potentiometers 104, 106 relative to their input shafts 108, 110 until the system is balanced.

I claim:

1. An encoding altimeter system comprising a first barometric sensing element, an encoder, motor means for driving said encoder, control means for said motor means, said control means including first means for operatively connecting said motor means to said first sensing element to drive said encoder in response to said first element, a second barometric sensing element for providing a first electrical output corresponding to the altitude being sensed, said control means including second means for operatively connecting said motor means to said second sensing element to drive said encoder in response to said second element, said second means including feedback means for providing a second electrical output effective to balance said first electrical output when said encoder is at an altitude position corresponding to the altitude being sensed, and said control means including means for transferring control of said motor means between said first and second means.

2. The invention of claim 1 in which said second sensing element is a transducer electrically connected to a voltage source such that said first electrical signal is a voltage output corresponding to the altitude being sensed, said feedback means including potentiometer means drivingly connected to said encoder and electrically connected to a voltage source such that said second electrical signal is a voltage output corresponding to the altitude position of said encoder.

3. The invention of claim 2 in which motor means includes first and second stepping motors with, respectively, first and second energizing circuits, said first motor being arranged to drive said encoder upwardly in steps and said second motor being arranged to drive said encoder downwardly in steps, said second means including first and second amplifiers connected, respectively, to said first and second energizing circuits, each of said amplifiers having an input terminal connected to the output of said transducer and another input terminal connected to the output of said potentiometer means, whereby, when the output of said potentiometer means balances the output of said transducer, neither amplifier will provide an output to its associated motor energizing circuit.

4. The invention of claim 3 in which said potentiometer means includes a pair of potentiometers cross connected to provide a bridge circuit having its input connected across a voltage source, said potentiometers having wipers drivingly connected to said encoder and providing outputs for said bridge circuit, one of said wipers being connected to the second mentioned input terminal of each amplifier.

5. The invention of claim 4 in which said potentiometers are adjustable selectively to establish a dead zone bracketing the altitude being sensed by said first barometric element and throughout which said bridge circuit will not put out an output effective to energize either motor energizing circuit.

6. The invention of claim 1 in which said encoder includes an output shaft, the rotational positions of which correspond to ranges of altitude within the total range of the system, said second sensing element being a transducer electrically connected to a voltage source such that said first electrical signal is a voltage output corresponding to the altitude being sensed, and linearity compensation means connected to the output of said transducer, said compensation means including a plurality of resistor means and rotary switch means drivingly connected to said output shaft and arranged to select a predetermined compensation resistance for each range of altitude.

7. The invention of claim 1 in which said feedback means includes potentiometer means drivingly connected to said encoder and electrically connected to a voltage source such that said second electrical signal is a voltage output corresponding to the altitude position of said encoder, said encoder including an output shaft, the rotational positions of which correspond to ranges of altitude within the total range of the system, and altitude scale factor calibration means including a plurality of resistor means connected to said potentiometer means and rotary switch means drivingly connected to said output shaft and arranged to select a predetermined calibration resistance for each range of altitude.

8. The invention of claim 7 in which said second sensing element is a transducer electrically connected to a voltage source such that said first electrical signal is a voltage output corresponding to the altitude being sensed, and linearity compensation means connected to the output of said transducer, said compensation means including a plurality of resistor means and rotary switch means drivingly connected to said output shaft and arranged to select a predetermined compensation resistance for each range of altitude.

9. The invention of claim 1 in which said transfer means includes switch means for activating and deactivating said first means to permit control by said second means, said switch means being responsive to said first and second electrical outputs to activate said first means when said outputs are balanced.

10. The invention of claim 1 in which said feedback means includes a pair of potentiometers cross connected to provide a bridge circuit having its input connected across a voltage source, said potentiometers having wipers drivingly connected to said motor means and providing outputs for said bridge circuit, said potentiometers being adjustable relative to each other to provide a dead zone for said feedback means.

11. An encoding altimeter system comprising an altimeter having a pointer arranged for movement about an axis, means for tracking said pointer, said tracking means including plate means supported for rotation about said axis and adjacent said pointer, light source means and light-responsive means mounted on said plate means and cooperating electro-optically to determine when said pointer moves, motor means for driving said plate means to keep said light source means and light-responsive means tracking said pointer, control means for said motor means, said control means including first means operatively connecting said motor means to said light-responsive means, an encoder drivingly connected to said motor means for movement with said plate means, and an altitude sensor for providing a first electrical output corresponding approximately to the altitude being sensed, said control means including second means for operatively connecting said motor means to said altitude sensor to drive said plate means in response to the output of said sensor, said second means including feedback means for providing a second electrical output corresponding to the altitude position of said plate means, whereby said motor means will stop driving said plate means when said second electrical output balances said first electrical output, and said control means including means for transferring control of said motor means between said first and second means.

12. The invention of claim 11 in which said altitude sensor is a transducer electrically connected to a voltage source such that said first electrical signal is a voltage output corresponding to the altitude being sensed, said feedback means including potentiometer means drivingly connected to said motor means and electrically connected to a voltage source such that said second electrical signal is a voltage output corresponding to the altitude position of said encoder.

13. The invention of claim 12 in which said motor means includes first and second stepping motors with, respectively, first and second energizing circuits, said first motor being arranged to drive said encoder upwardly in steps and said second motor being arranged to drive said encoder downwardly in steps, said second means including first and second amplifiers connected, respectively, to said first and second energizing circuits, each of said amplifiers having an input terminal connected to the output of said transducer and another input terminal connected to the output of said potentiometer means, whereby, when the output of said potentiometer means balances the output of said transducer, neither amplifier will provide an output to its associated motor energizing circuit.

14. The invention of claim 13 in which said potentiometer means includes a pair of potentiometers cross connected to provide a bridge circuit having its input connected across a voltage source, said potentiometers having wipers drivingly connected to said motor means and providing outputs for said bridge circuit, one of said wipers being connected to the second mentioned input terminal of each amplifier.

15. The invention of claim 11 including altitude scale factor calibration means connected to said potentiometer means, said calibration means including rotary means providing variable resistance, said rotary means being drivingly connected to said motor means to provide a calibration resistance variable with the changes in altitude.

16. The invention of claim 15 including linearity compensation means connected to the output of said transducer, said compensation means including rotary means for providing variable compensation resistance, said rotary means being drivingly connected to said motor means to provide a compensation resistance variable with the changes in altitude.

17. The invention of claim 12 including linearity compensation means connected to the output of said transducer, said compensation means including rotary means for providing variable compensation resistance, said rotary means being drivingly connected to said motor means to provide a compensation resistance variable with the changes in altitude.

18. The invention of claim 12 including altitude scale factor calibration means connected to said potentiometer means, said calibration means including rotary means providing variable resistance, said rotary means being drivingly connected to said motor means to provide a calibration resistance variable with the changes in altitude.

19. The invention of claim 18 including linearity compensation means connected to the output of said transducer, said compensation means including rotary means for providing variable compensation resistance, said rotary means being drivingly connected to said motor means to provide a compensation resistance variable with the changes in altitude.

20. The invention of claim 11 in which said altitude sensor is a transducer electrically connected to a voltage source such that said first electrical signal is a voltage output corresponding to the altitude being sensed, said encoder including one disc rotatable through one revolution throughout the total altitude range of the system such that its rotational positions correspond to altitude positions within the total range, and linearity compensation means connected to the output of said transducer, said compensation means including rotary means for providing variable compensation resistance, said rotary means being drivingly connected to said disc to provide compensation resistance variable with changes in altitude.

21. The invention of claim 20 in which said feedback means includes potentiometer means drivingly connected to said motor means and electrically connected to a voltage source such that said second electrical signal is a voltage output corresponding to the altitude position of said encoder, and altitude scale factor calibration means connected to said potentiometer means, said calibration means including rotary means for providing variable calibration resistance, the last said rotary means being drivingly connected to said disc to provide calibration resistance variable with changes in altitude.

22. The invention of claim 11 in which said transfer means includes zero tab means on said encoder for providing an electrical signal establishing when said encoder is driven to zero, first switch means for energizing said motor means to drive said encoder downwardly, second switch means for energizing said motor means to drive said encoder upwardly, the second switch means being responsive to the output of said zero tab means to stop the downward driving of said encoder and to start the upward driving of said encoder, third switch means for stopping the upward driving of said encoder when said first and second electrical outputs are balanced, and fourth switch means for energizing and de-energizing said light source means of said tracking means, said fourth switch means being responsive to said first and second electrical outputs to permit said tracking means to control said motor means when said first and second electrical outputs are balanced.

23. The invention of claim 11 in which said transfer means includes switch means for energizing and de-energizing said light source means of said tracking means, said switch means being responsive to said first and second electrical outputs to permit said tracking means to control said motor means when said outputs are balanced.

24. The invention of claim 11 in which said transfer means includes switch means for activating and deactivating said tracking means, said switch means being responsive to said first and second electrical outputs to activate said tracking means when said outputs are balanced and to deactivate said tracking means when said outputs are unbalanced.

25. The invention of claim 11 in which said feedback means includes a pair of potentiometers cross connected to provide a bridge circuit having its input connected across a voltage source, said potentiometers having wipers drivingly connected to said motor means and providing outputs for said bridge circuit, said potentiometers being adjustable relative to each other to provide a dead zone for said feedback means.

26. In an encoding altimeter system including an encoder and motor means for driving said encoder in response to the output of a barometric element, means for setting and resetting said system including an altitude sensor for providing a first electrical output corresponding approximately to the altitude being sensed, feedback means for providing a second electrical output corresponding to the altitude position of said encoder, said feedback means being drivingly connected to said motor means, and control means including means for transferring the control of said motor means to said barometric element when said first and second outputs are balanced.

27. The invention of claim 26 in which said feedback means includes a pair of potentiometers cross connected to provide a bridge circuit having its input connected across a voltage source, said potentiometers having wipers drivingly connected to said motor means and providing outputs for said bridge circuit, said potentiometers being adjustable relative to each other to provide a dead zone for said feedback means.

* * * * *

UNITED STATES PATENT OFFICE
CERTIFICATE OF CORRECTION

Patent No. 3,815,419  Dated June 11, 1974

Inventor(s) Karl W. Springer

It is certified that error appears in the above-identified patent and that said Letters Patent are hereby corrected as shown below:

Column 13, line 47 (Claim 15, line 1) "The invention of claim 11" should be -- The invention of claim 14 --.

Signed and sealed this 1st day of October 1974.

(SEAL)
Attest:

McCOY M. GIBSON JR.
Attesting Officer

C. MARSHALL DANN
Commissioner of Patents